United States Patent

Eguchi et al.

[11] Patent Number: 5,668,713
[45] Date of Patent: Sep. 16, 1997

[54] INVERTER CONTROL METHOD AND INVERTER CONTROL DEVICE PERFORMING FEEDBACK CONTROL BY SUPPRESSING DELAY

[75] Inventors: Masaki Eguchi, Uji; Hirokazu Kodama, Gojo; Tsukasa Takebayashi; Hirofumi Nakata, both of Yamatotakada, all of Japan

[73] Assignee: Sharp Kabushiki Kaisha, Osaka, Japan

[21] Appl. No.: 729,583

[22] Filed: Oct. 11, 1996

[30] Foreign Application Priority Data

Oct. 16, 1995 [JP] Japan ................................. 7-267495

[51] Int. Cl.$^6$ ................................. H02M 7/04
[52] U.S. Cl. ................................. 363/95
[58] Field of Search ................................. 363/20–21, 41, 363/74–78, 79–81, 95–97, 131–132; 323/234, 242, 282, 285, 287–288

[56] References Cited

U.S. PATENT DOCUMENTS 5,572,416  11/1996  Jacobs et al. ................................. 363/89

OTHER PUBLICATIONS

Y. Abe, et al., "PWM Control of Solar Generation System in Accordance with DSP", Record of the 1993 Kansai–Section Joint Convention of Institutes of Electrical Engineering, Japan p. G161.

*Primary Examiner*—Aditya Krishnan
*Attorney, Agent, or Firm*—David G. Colin; William J. Daley, Jr.

[57] ABSTRACT

In a method of controlling an inverter for adjusting a periodic inverter output waveform to a desired periodic waveform, an error waveform pattern between an inverter output waveform of the present prescribed period and a desired periodic waveform generated in synchronization with the prescribed period is formed, and the error waveform pattern is added to an inverter driving waveform pattern in the last prescribed period, whereby an inverter driving waveform pattern is updated.

12 Claims, 6 Drawing Sheets

POINT A — S1

POINT B — S2

POINT C — S3

POINT D — Io(n)

INVERTER CONTROL METHOD AND INVERTER CONTROL DEVICE PERFORMING FEEDBACK CONTROL BY SUPPRESSING DELAY

CROSS-REFERENCE TO RELATED APPLICATION

This application is related to copending application Ser. No. 08/438,551, filed May 10, 1995, commonly assigned with the present invention.

BACKGROUND OF THE INVENTION

1. Field of the Invention

The present invention relates to an inverter device used in a power converter or the like and, more specifically, to a method and device for controlling an inverter performing feedback control of an output waveform.

2. Description of the Background Art

An inverter control device shown in FIG. 1 has been known. The inverter control device 50 controls an inverter main circuit 53 which drives an AC load 52 using a DC power source 51 as an input. A DSP (Digital Signal Processor) 54 instantaneously controls the value of the output current from inverter main circuit 53.

The method of control by inverter control device 50 will be described in the following. A current detector 55 detects a value of an output current from inverter main circuit 53, and the output current value is subjected to A/D conversion at a prescribed sampling frequency by an A/D converter 56. The output current signal $I_0$ provided by the A/D conversion is input together with a reference current signal $I_C$ to DSP 54. DSP 54 has functions of an error amplifying portion 57 and a PWM (pulse width modulation) operating portion 58, and based on the output current signal $I_0$ and the reference current signal $I_C$ input to DSP 54, error amplifying portion 57 calculates an error amplified signal $E=\alpha\,(I_C-I_0)$. Based on the error amplified signal E, PWM operating portion 58 calculates a gate on time $T_{on}$ of a plurality of switching elements, not shown, constituting inverter main circuit 53. DSP 54 outputs the calculated gate on time $T_{on}$ to a timer count circuit 59. Based on the input gate on signal $T_{on}$, timer count circuit 59 generates a gate driving signal G for each switching element, and outputs it to a gate driving circuit 60. In gate driving circuit 60, based on the gate driving signal G input thereto, switching of the switching elements in inverter main circuit 53 is performed.

As for the input of output current signal $I_0$ and reference current signal $I_C$, calculation of error amplified signal E, and calculation and output of gate on time $T_{on}$, these are continuously executed at prescribed sampling period. Further, in order to suppress high frequency oscillation of the output current, a lowpass filter 61 may be provided on the side of the output signal of error amplifying portion 57. In this case, lowpass filter 61 filters the error amplified signal E, and PWM operating portion 58 performs PWM operation using the filtered output. In controlling an inverter, a delay generated in a signal path causes oscillation in a high frequency range. Therefore, in order to enable stable control of an inverter output, control of the delay is important. However, in the conventional inverter control device 50 in which the value is instantaneously controlled, generation of a delay in a feedback loop through a lowpass filter, not shown, included in inverter main circuit 53, current detector 55 for detecting the current value from the output of the inverter and through the DSP 54 calculating and outputting the gate on time $T_{on}$ is inevitable because of the structural characteristics.

In order to cope with this problem, conventionally, a lowpass filter is provided for reducing the influence of delay in the high frequency range, where the influence of delay is more severe, so as to lower the feedback gain in the high frequency range. However, even when such a measure is taken, there is still a delay generated in the lowpass filter itself. Therefore, the lowpass filter, which is provided as a solving means, causes a new delay, and high frequency oscillation cannot always be satisfactorily suppressed.

In order to lower feedback gain in the high frequency range effectively by using a lowpass filter, generally, cut off frequency is made lower or an amount of attenuation is increased. However, by such a method, the delay in the lowpass filter is increased, and therefore, the feedback gain cannot be readily reduced.

SUMMARY OF THE INVENTION

An object of the present invention is to provide a method and device for controlling an inverter which enable stable control by suppressing delay, which is a cause of high frequency oscillation.

According to an aspect of the present invention, in the method of controlling an inverter, an error waveform pattern between an inverter output waveform of the present prescribed period and a desired periodic waveform generated in synchronization with the prescribed period is formed. The error waveform pattern is added to an inverter driving waveform pattern of the last prescribed period, so as to update the inverter driving waveform pattern.

According to another aspect of the present invention, the inverter control device includes a memory portion for storing an inverter driving waveform pattern of the last prescribed period, an error waveform pattern forming portion for forming an error waveform pattern between an inverter output waveform of the present prescribed period and a desired periodic waveform generated in synchronization with the prescribed period, and an updating portion for adding the error waveform pattern generated at the error waveform pattern forming portion to the inverter driving pattern of the last prescribed period stored in the memory portion, for updating the inverter driving waveform pattern.

By adding the error waveform pattern to the inverter driving waveform pattern of the last prescribed period, the inverter output is updated at every prescribed period. Therefore, it becomes possible to perform feedback control with the delay time corrected, and the error waveform pattern gradually converges to zero. Therefore, the present invention provides the effect that oscillation in the high frequency range caused by the delay can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
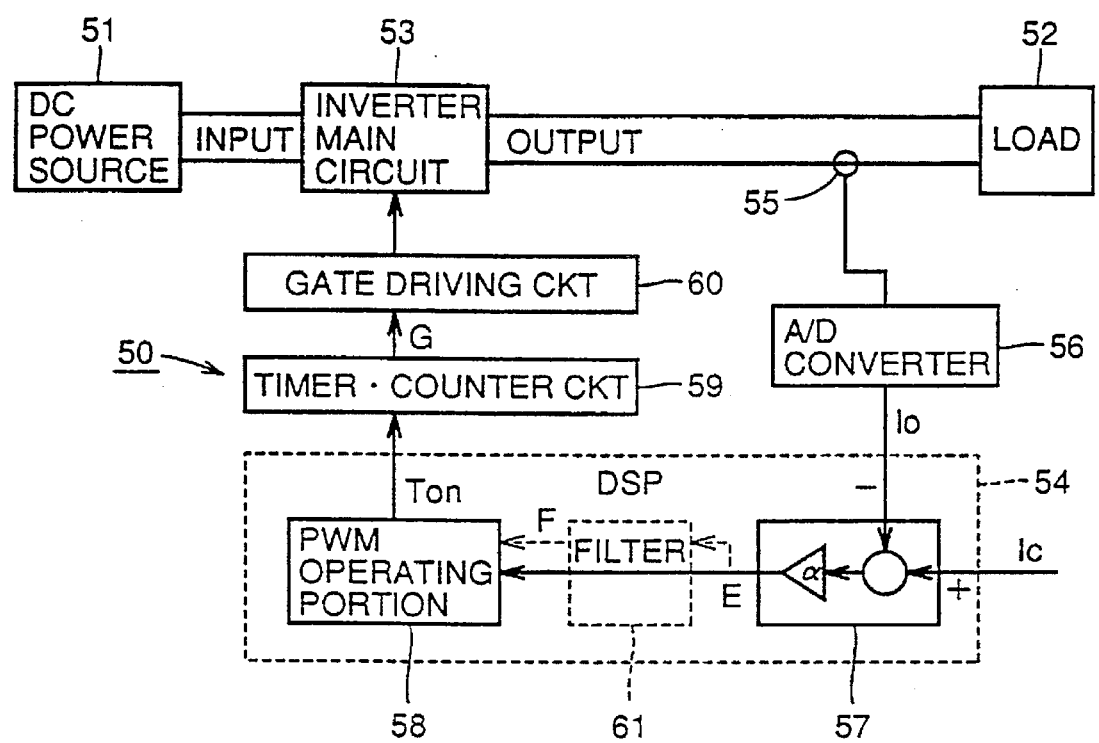
FIG. 1 is a block diagram showing a structure of a conventional inverter device.
Figure 2:
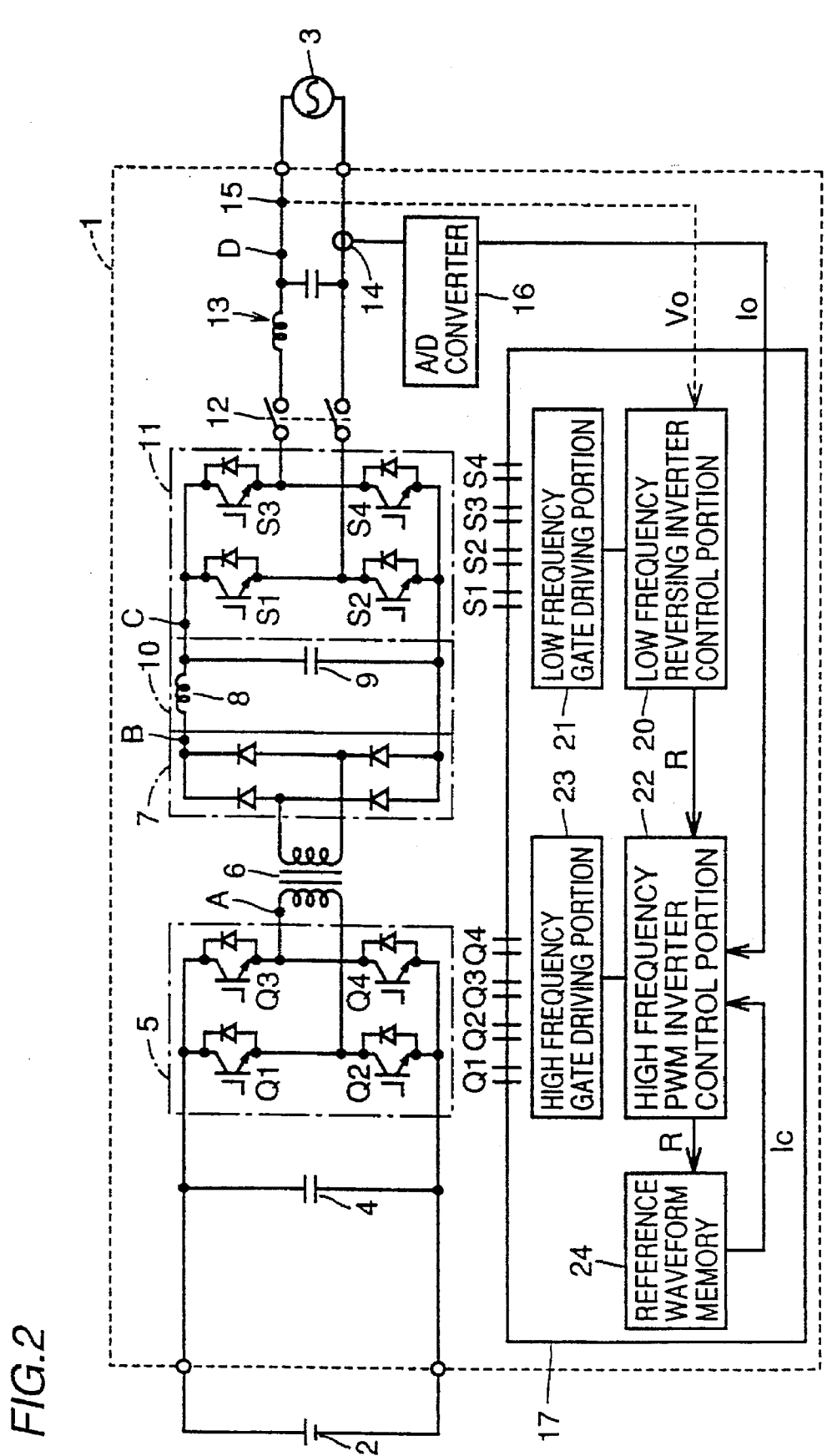
FIG. 2 is a block diagram showing a structure of an inverter device incorporating the inverter control device of the present invention.

Referring to FIG. 2, an inverter device 1 converts a DC power output from a solar cell 2 to an AC power having the same phase and frequency (50/60 Hz) as the mains (commercially used power source) 3, and supplies it to the mains 3.

Inverter device 1 includes a capacitor 4, a high frequency inverter bridge 5, a high frequency transformer 6, a diode bridge 7, a filter circuit 10, a low frequency inverter bridge 11, a relay 12, an AC filter 13, an inverter output current detector 14, a voltage detector 15, an A/D converter 16 and an inverter control device 17.

Capacitor 4 suppresses fluctuation of the DC voltage output from solar cell 2. High frequency inverter bridge 5 converts the DC power input to inverter device 1 to a high frequency alternating current (tens to several hundreds KHz). High frequency transformer 6 insulates solar cell 2 (primary side) from the mains 3 (secondary side). Diode bridge 7 rectifies the high frequency alternating current insulated by high frequency transformer 6. Filter circuit 10 includes a DC reactor 8 and a capacitor 9, and it smoothes the waveform rectified by the diode bridge 7, by removing the high frequency component. Low frequency inverter bridge 10 controls the DC output from filter circuit 10 by reversing the output with low frequency (50/60 to several hundreds Hz), and produces low frequency alternating current. Relay 12 relays and disconnects the inverter output, that is, the low frequency alternating current produced by low frequency inverter bridge 11, to and from the mains 3. AC filter 13 removes high frequency component of the inverter output. Output current detector 14 detects current value of the inverter output. Voltage detector 15 detects the voltages of inverter output and mains 3. A/D converter 16 performs A/D conversion of the current value detected by output current detector 15. Inverter control device 17 controls high frequency inverter bridge 5 and low frequency inverter bridge 11. Inverter control device 17 takes out an inverter output waveform at every prescribed period (as the prescribed period, ¼ period, ½ period, one period, n periods (n: natural number) may be available). An error data between the presently taken out inverter output waveform of the prescribed period and a desired periodic waveform is generated, and the error data is fedback to the inverter driving waveform of the last prescribed period for controlling the inverter output. For this operation, the control device has the following structure.

Namely, inverter control device includes a low frequency reversing inverter control portion 20, a low frequency gate driving portion 21, a high frequency PWM inverter control portion 22, a high frequency gate driving portion 23 and a reference waveform memory 24.

Low frequency reversing inverter control portion 20 controls the DC waveform by reversing the waveform in synchronization with a zero cross of the mains voltage. Low frequency gate driving portion 21 outputs pulses for controlling switching of the low frequency inverter bridge 11, under the control by low frequency reversing inverter control portion 20. High frequency PWM inverter control portion 22 controls the inverter output current waveform such that it has a sinusoidal waveform in phase with the voltage of the mains 3. High frequency gate driving portion 23 switches the high frequency inverter bridge 5 under the control by high frequency PWM inverter control portion 22. Reference waveform memory 24 stores the sinusoidal waveform reference current signal $I_C$ which is the desired periodic waveform of the inverter output, and supplies the stored sinusoidal waveform reference current signal $I_C$ to high frequency PWM inverter control portion 22 in synchronization with the mains synchronizing signal R.

In order to synchronize the control of DC waveform by reversing with the zero cross of the mains voltage, low frequency reversing inverter control portion 20 generates a mains synchronizing signal R based on the voltage signal detected by mains voltage detector 15, and supplies the generated mains synchronizing signal R to high frequency PWM inverter control portion 22 and reference waveform memory 24.

Figure 3:
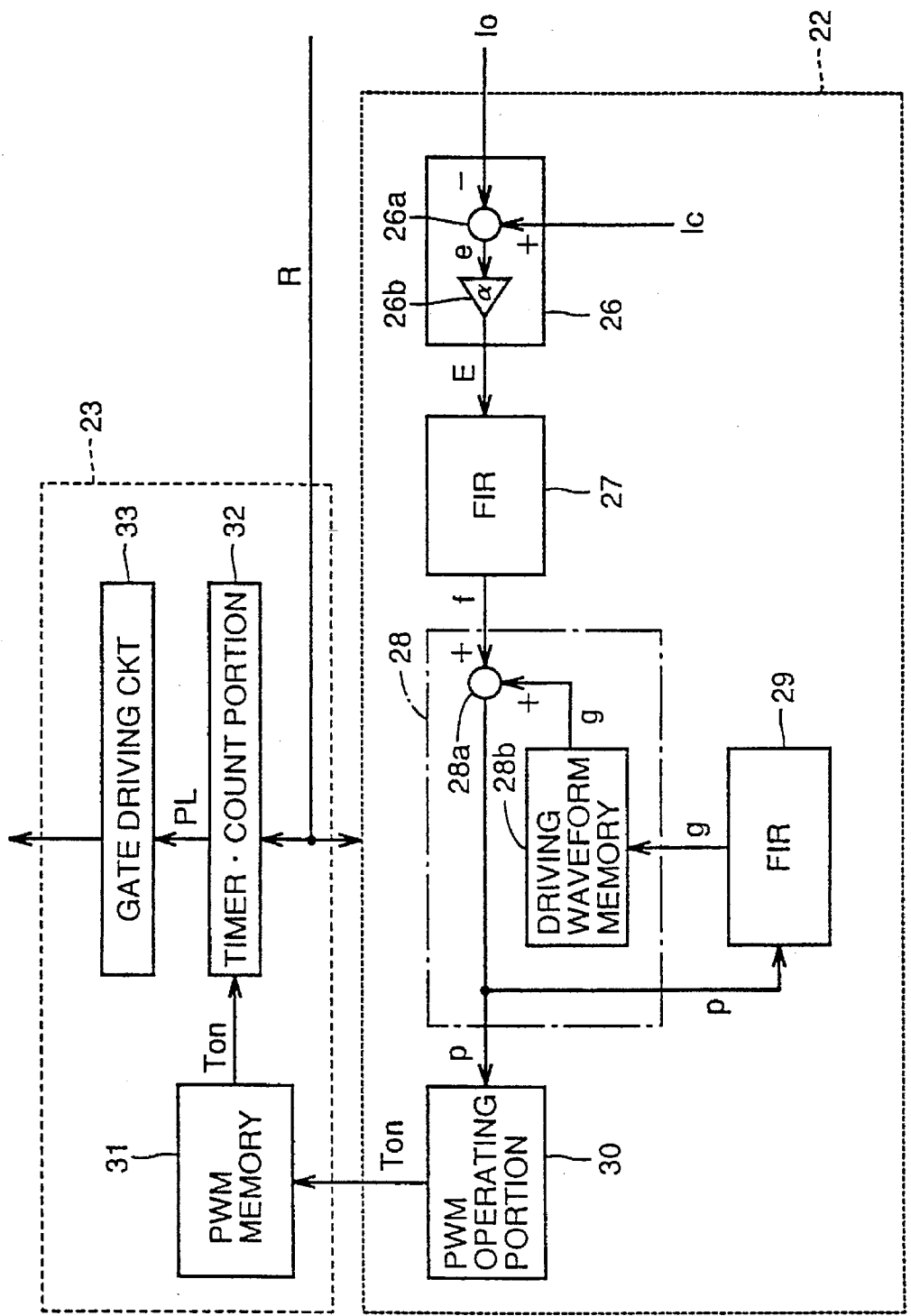
FIG. 3 is a block diagram showing a structure of the inverter control device in accordance with the present invention.
Figure 4A:
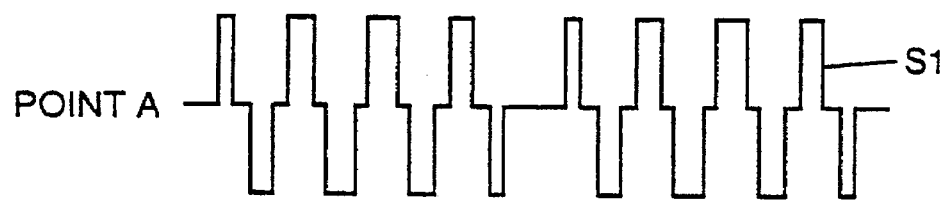
FIG. 4 shows signal waveforms during the formation of the waveform in the inverter device of the present invention.
Figure 4B:
Figure 4C:
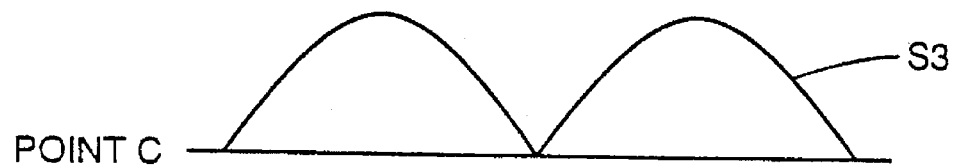
Figure 4D:
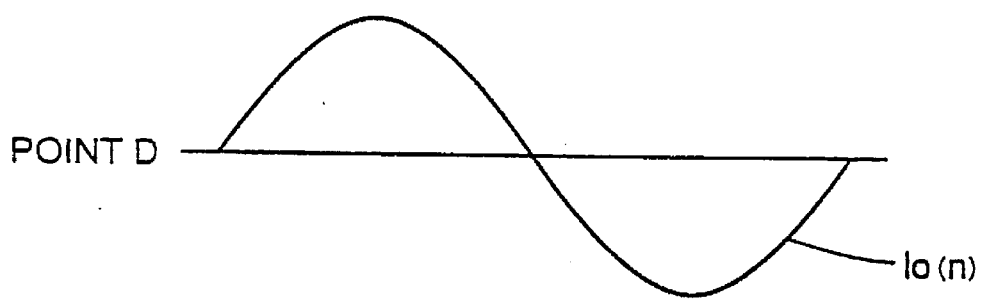

The structure of the high frequency PWM inverter control portion 22 will be described with reference to FIG. 3. High frequency PWM inverter control portion 22 includes an error amplified signal generating portion 26, a first lowpass filter 27, an error waveform integrating portion 28, a second lowpass filter 29, and a PWM operating portion 30.

Error amplified signal generating portion 26 generates, from inverter output current signal $I_0$ supplied from A/D converter 16 and the sinusoidal waveform reference current signal $I_C$ supplied from reference waveform memory 24, an error amplified signal E. Error amplified signal generating portion 26 includes a subtracting portion 26a and error amplifying portion 26b. Subtracting portion 26a generates an error signal $e=(I_C-I_0)$ between inverter output current signal $I_0$ and sinusoidal waveform reference current signal $I_C$, and error amplifying portion 26b multiply the error signal e generated by subtracting portion 26a by an error amplification rate $\alpha(0<\alpha\leq 1)$ to generate the error amplified signal E.

The first lowpass filter (FIR) 27 removes the high frequency component included in the error amplified signal E.

Error waveform integrating portion 28 integrates the error amplified signal f after the high frequency component removed, and forms an inverter driving waveform pattern p. Error waveform integrating portion 28 includes an adding portion 28a and a driving waveform memory 28b. Adding portion 28a adds, to the error amplified signal f with the high frequency component removed supplied from the first lowpass filter 27 in the present prescribed period, the inverter driving waveform pattern g of the last prescribed period with the high frequency component removed, stored in the driving waveform memory 28b, thereby generating the inverter driving waveform pattern p.

Second lowpass filter 29 removes the high frequency component of the inverter driving waveform pattern p generated at adding portion 28a, and supplies it to the driving waveform memory 28b. Driving waveform memory 28b stores the inverter driving waveform pattern g with the high frequency removed by the second lowpass filter.

PWM operating portion 30 performs PWM operation on the inverter driving waveform pattern p generated at error waveform integrating portion 28, and calculates the gate on time $T_{on}$.

Gate driving portion 23 includes a PWM memory 31, a timer count portion 32, and a gate driving circuit 33. PWM memory 31 stores data of the gate on time $T_{on}$ calculated by PWM operating portion 30. Timer count portion 32 successively reads the data of the gate on time $T_{on}$ stored in PWM memory 31 in synchronization with the mains synchronizing signal R, thereby generating pulses PL for controlling switching of the high frequency inverter bridge 5. Gate driving circuit 33 switches high frequency inverter bridge 5 based on the pulses PL generated by timer count portion 32.

The control of inverter device 1 by the inverter control device 17 will be described.

Inverter control by the inverter control device 17 is basically performed by the following manner. More specifically, an inverter driving waveform pattern using a prescribed period of the inverter output (n periods (n: natural number), one period, .half period, ¼ period or the like) as one set, is prepared. The inverter driving waveform pattern is subjected to PWM operation, so that data of the gate on time $T_{on}$ for the one set is prepared. By using the data of the gate on time $T_{on}$ repeatedly, switching of the high frequency inverter bridge is performed.

In such switching operation of the high frequency inverter bridge 5, the following feedback control is performed. Namely, the inverter driving waveform pattern of the last prescribed period is stored. Meanwhile, an error waveform pattern (error signal) e between a desired periodic waveform (sinusoidal waveform reference current signal) $I_C$ and the inverter output waveform (inverter output current signal) $I_O$ is generated, and by multiplying the error waveform pattern e by an arbitrary coefficient $\alpha$ ($0<\alpha\leq 1$), an error amplified signal E is formed. By adding the error amplified signal E to the stored inverter driving waveform pattern of the last prescribed period, the inverter driving waveform pattern is updated. In this manner, the PWM operation is newly performed using the updated inverter driving waveform pattern to form the gate on time, the inverter output will be closer to the desired periodic waveform gradually.

The method of feedback control of the inverter control device 17 is not an instantaneous control of the value. It updates the inverter output at every one or half period of the output waveform.

Further, in inverter control device 17, the phase of the error amplified signal E is advance by a prescribed period relative to the stored inverter driving waveform pattern of the last prescribed period, and then it is added to the inverter driving waveform pattern. At this time, how much the phase is advance is determined such that it matches the total time of delay generated for forming the inverter output and the delay generated for forming the error amplified signal f after the removal of the high frequency component, so as to cancel the delay.

Further, the inverter driving waveform pattern is stored after the high frequency component is removed. By adding the error amplified signal f after the high frequency component is removed to the inverter driving waveform pattern with the high frequency component removed, the high frequency noise can be removed more effectively. Here, delay is generated also in the process for removing the high frequency component of the inverter driving waveform pattern. However, this delay is also canceled by the advance in phase in the similar manner as described above.

The operation of inverter control by the inverter control device 17 will be described in greater detail. In the inverter device 1, reversing control is performed by low frequency inverter bridge 11. Therefore, what is required of the high frequency inverter bridge 5 is simply to output a waveform corresponding to half or one period of the fundamental frequency of the inverter output repeatedly. In the following, the inverter control is described assuming that operation for ½ period is performed for every one period of the fundamental frequency.

Let us represent the number of counts of every one period of the fundamental frequency synchronized with the mains synchronizing signal R by n, the number of waveform portion in ½ period (for example, former ½ period) constituting each period by i(i=0, 1, . . . I–1). Let us represent the error signal by $e_i$ (n) and error amplification rate by $\alpha(0<\alpha\leq 1)$. Then, the output $f_i$ (n) of the first lowpass filter 27, the inverter driving waveform pattern $p_i(n)$ input to PWM operating portion 30, and inverter driving waveform pattern $g_i$ (n) stored in driving waveform memory 28b are represented by the following equations.

$$f_i(n) = \alpha \sum_{j=0}^{N-1} h_j(n) e_{i-j}(n) \quad (1)$$

$$p_i(n) = g_i(n - 1) + f_{i+\tau}(n) \quad (2)$$

$$g_i(n) = \sum_{j=0}^{M-1} c_j \cdot P_{i-j+d}(n) \quad (3)$$

In equation (1), $h_j$ represents a filter coefficient of an N tap digital filter constituting the first lowpass filter 27. In equation (2), $\tau$ represents a time step for correcting the delay generated in the process of forming the error waveform (error amplified signal f after the high frequency component is removed). In equation (3), $c_j$ represents a filter coefficient of an odd numbered M tap digital filter constituting the second lowpass filter 29, and d represents a time step for correcting the delay generated in the filtering operation by this filter.

In equation (3), if the digital filter is of symmetrical type, the value d can be calculated by the following equation (4).

$$d=(M-1)/2 \quad (4)$$

As for the inverter driving waveform pattern g in equations (2) and (3), it is stored in driving waveform memory 28b. As an initial value, 0 is applied. Therefore, there are a number of (I) "O"s in the driving waveform memory 28b in the initial state. Each of these of the inverter driving waveform pattern g is added to the output f of the first lowpass filter 27 in accordance with the equation (2), so that an inverter driving waveform pattern p including I pieces of data is calculated. The signal p is output to PWM operating portion 30. In addition, it is subjected to the operation represented by the equation (3) by the second lowpass filter 21 so that the high frequency noise component thereof is removed, and thereafter it is stored as inverter driving waveform pattern g with the high frequency component removed, in driving waveform memory 28b.

Then, when the mains synchronizing signal R is input, the period count n is incremented, and operations of equations (1), (2) and (3) are executed. At this time, in the operation of equation (2), to the inverter driving waveform pattern g stored in the driving waveform memory 28b in the last prescribed period, the waveform pattern of the output f from the first lowpass filter 27 of the present prescribed period is added, whereby the inverter driving waveform pattern p is updated. Thereafter, by repeating similar operation, the error amplified signal E converges to 0, and desired inverter driving waveform pattern g is stored in the driving waveform memory 28b. At this time, the count n of the periods is incremented by mains synchronizing signal R, so as to be synchronized with the mains voltage.

Inverter control by the inverter control device 17 will be described in greater detail referring to the waveforms of FIGS. 4 and 5.

When the first mains synchronizing signal R (0) is output, a sinusoidal waveform reference current signal $I_C$ is supplied to subtracting portion 26a in synchronization with the mains synchronizing signal R, from reference waveform memory 24. At this time, there is not yet an inverter output. Therefore, the inverter output current signal $I_0$ has not yet being supplied to subtracting portion 26a. Therefore, at this timing, the sinusoidal waveform reference current signal $I_C$ is output as error signal $e_{(0)}$ to error amplifying portion 26b. Error amplifying portion 26b forms the error amplified signal $E_{(0)}$ from the supplied error signal $e_{(0)}$, and outputs it to the first lowpass filter 27. The first lowpass filter 27 performs the operation of equation (1) above, in order to remove high frequency component of error amplified signal $e_{(0)}$ and outputs the result as an output $f_{(0)}$ to error waveform integrating portion 28. At this time, the output $f_{(0)}$ is delayed by $\tau b$ by the filtering operation at the first lowpass filter 27. However, this delay is corrected by the delay correcting operation in the subsequent period.

In error waveform integrating portion 28, the operation of equation (2) above is performed, so that the received output $f_{(0)}$ of the first lowpass filter 27 is added to the output g of driving waveform memory 28b at adding portion 28a. At this time, since this is the time of generation of the first mains synchronizing signal $R_{(0)}$, there is not the inverter driving waveform pattern g with the high frequency component removed, stored in driving waveform memory 28b. Therefore, the output $f_{(0)}$ of the first lowpass filter 27 is output as the inverter driving waveform pattern $p_{(0)}$ from adding portion 28a.

The inverter driving waveform pattern $P_{(0)}$ output from adding portion 28a is subjected to the operation of equation (3) above by second lowpass filter 29 so that the high frequency noise component is removed therefrom, and thereafter, the pattern is stored as driving waveform pattern $g_{(0)}$ in driving waveform memory 28b. At this time, the driving waveform pattern $g_{(0)}$ is delayed by d due to the filtering operation by the second lowpass filter 29. However, the delay is corrected during the filtering operation of the second lowpass filter 29 as shown by the equation (3).

Meanwhile, PWM operating portion 30 which has received such an inverter driving waveform pattern performs PWM on inverter driving waveform pattern $p_{(0)}$ to calculate gate on time $T_{on}$, and outputs the calculated value to high frequency gate driving portion 23.

In gate driving portion 23, the data of the received gate on time $T_{on}$ is stored in PWM memory 31, the data of the gate on time $T_{on}$ is successively read by the timer count portion 32 in synchronization with the mains synchronizing signal $R_{(0)}$, so that pulses PL for controlling switching of the high frequency inverter bridge 5 are formed. Based on the generated pulses PL, high frequency inverter bridge 5 is switched by gate driving circuit 33. When the high frequency inverter bridge 5 is switched in this manner, high frequency pulses s1 shown in FIG. 4 (a) is generated at point A of FIG. 2. Though the pulses s1 are shown schematically in FIG. 4(a), actually, the pulses are high frequency pulses of 19 KHz, for example.

The high frequency pulses s1 insulated by high frequency transformer 6 are rectified by diode bridge 7. Therefore, a pulse signal s2 such as shown in (b) of FIG. 4 is generated at point B of FIG. 2. The pulse signal s2 rectified by diode bridge 7 has its high frequency component removed by filter circuit 10 and smoothed, so that a DC output s3 shown in (c) of FIG. 4 is generated at point C of FIG. 2. The DC output s3 generated in this manner is reversed at a low frequency ($\frac{50}{60}$ to several hundreds Hz) by low frequency inverter bridge 11. Therefore, at point D of FIG. 2, an inverter output $I_{0(0)}$ of low frequency corresponding to one period is generated. The low frequency inverter bridge 11 is driven by low frequency gate driving portion 21 which is controlled by the low frequency reversing inverter control portion 20.

The generated inverter output $I_{0(0)}$ of one period is relayed to and disconnected from the mains 3 by relay 12.

Meanwhile, the generated inverter output $I_{0(0)}$ of one period is detected by output current detector 14. The detected inverter output $I_{0(0)}$ of one period is subjected to A/D conversion by A/D converter 16, and then supplied to high frequency PWM inverter control portion 22.

Figure 5A:
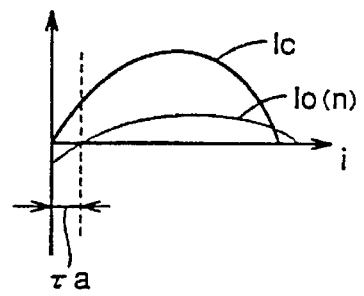
FIGS. 5A to 5H show the process of waveform shaping by the inverter control device in accordance with the present invention.
Figure 5B:
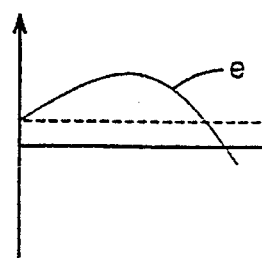
Figure 5C:
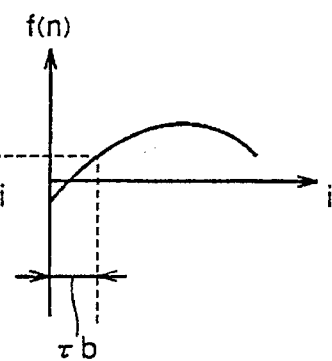

In high frequency PWM inverter control portion 22, the supplied inverter output $I_{0(0)}$ is input to the subtracting portion 26a of error signal generating portion 26. Then, subtracting portion 26a generates an error signal $e_{(1)}$ from the inverter output $I_{0(0)}$ and the sinusoidal waveform reference current signal $I_C$ input from the reference waveform memory 24 to error signal generating portion 26 in synchronization with the second generated mains synchronizing signal $R_{(1)}$. At this time, inverter output $I_{0(0)}$ is delayed by $\tau a$ from sinusoidal wave reference current signal $I_C$ because of the signal processing in inverter device 1, as shown in FIG. 5A. Therefore, the error signal $e_{(1)}$ has such a waveform as shown in FIG. 5B. Error amplifying portion 26b multiplies the error signal $e_{(1)}$ by $\alpha(0<\alpha \leq 1)$ to generate error amplified signal $E_{(1)}$ and outputs it to the first lowpass filter 27. The first lowpass filter 27 removes the high frequency component of error amplified signal $E_{(1)}$ and outputs the result as an output $f_{(1)}$ shown in FIG. 5C to error waveform integrating portion 28. At this time, the output $f_{(1)}$ from the first lowpass filter 27 is output delayed by $\tau b$, because of the filtering operation by the first lowpass filter 27.

In error waveform integrating portion 28, addition in accordance with the equation (2) above is performed at adding portion 28a on the output $f_{(1)}$ of the received first lowpass filter 27 and the output g from the driving waveform memory 28b, that is, the inverter driving wave form pattern $g_{(0)}$ of the last period with the high frequency component removed by the second lowpass filter 29, so that the inverter driving waveform pattern $P_{(1)}$ is updated.

Figure 5D:
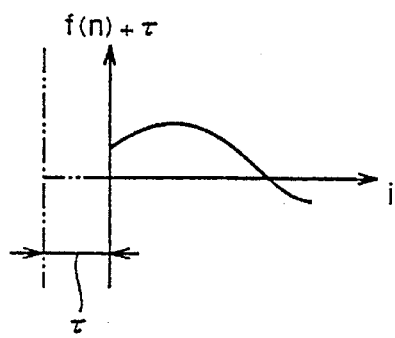
Figure 5E:
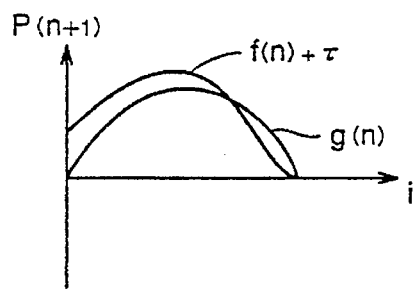

At this time, the phase of output $f_{(1)}$ with its high frequency component removed by the first lowpass filter 27 is advanced by the period $\tau$ relative to the output $g_{(0)}$ of the driving waveform memory 28b as shown in FIG. 5D, and then it is added to the output $g_{(0)}$ of the driving waveform memory 28b as shown in FIG. 5E, at adding portion 28a.

In this manner, adding portion 28a corrects the delay by advancing the phase by $\tau$. The amount of correction $\tau$ is set to be a value ($\tau=\tau a+\tau b$) obtained by adding the delay $\tau a$ experienced in inverter device 1 and the delay $\tau b$ experienced in the first lowpass filter 27.

However, actually, it is not possible to have the phase of the output $f_{(1)}$ from the first lowpass filter 27 advanced by the time $\tau$. Therefore, PWM memory 31 is adapted to store the gate on time $T_{on}$ of the prescribed period, similar to the driving waveform memory 28b, for example. When the gate on time $T_{on}$ earlier by the time $\tau$ with respect to the output $g_{(1)}$ of driving waveform memory 28b is output from PWM memory 31 to timer count portion 32, then the output $f_{(1)}$ from the first lowpass filter 27 comes to have its phase advance by $\tau$ relatively.

Figure 5F:
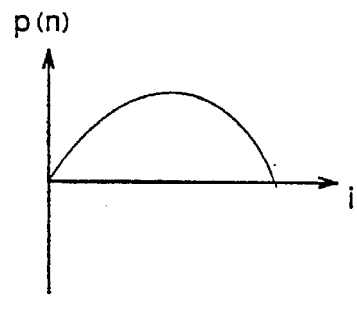

The inverter driving waveform pattern $p_{(1)}$ generated by the adding portion 28a shown in FIG. 5F is supplied to PWM operating portion 30 as well as to the second lowpass filter 29.

Figure 5G:
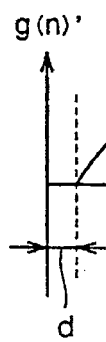
Figure 5H:
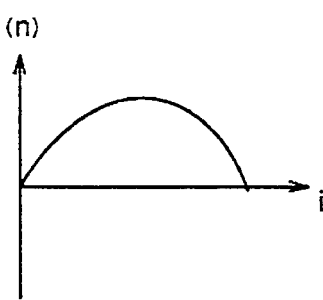

The inverter driving waveform pattern p supplied to the second lowpass filter 29 has its high frequency noise component removed as shown in FIG. 5G, and thereafter stored as driving waveform pattern $g_{(1)}$ in driving waveform memory 28b. The driving waveform pattern $g_{(1)}$ stored in the driving waveform memory 28b is delayed by the time d because of the high frequency filtering operation by the second lowpass filter 29. However, the delay d can be corrected as shown in FIG. 5H, by the operation of equation (3) by the second lowpass filter 29.

The PWM operating portion 30 which has received such an inverter driving waveform pattern $p_{(1)}$ performs PWM operation on the inverter driving waveform pattern calculates the gate on time $T_{on}$ and outputs it to the high frequency gate driving portion 23. Thereafter, similar operation as described above is performed, whereby an inverter output is provided.

In this manner, PWM operation is newly performed using the updated inverter driving waveform pattern $p_{(n)}$ and the gate on time is provided, so that the inverter output gradually becomes closer to the desired periodic waveform.

Figure 6A:
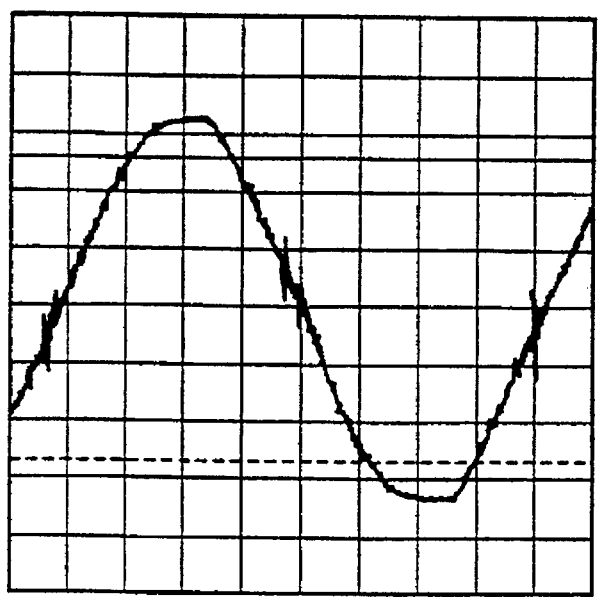
FIGS. 6A and 6B show inverter output waveforms of the inverter device in accordance with the present invention.
Figure 6B:
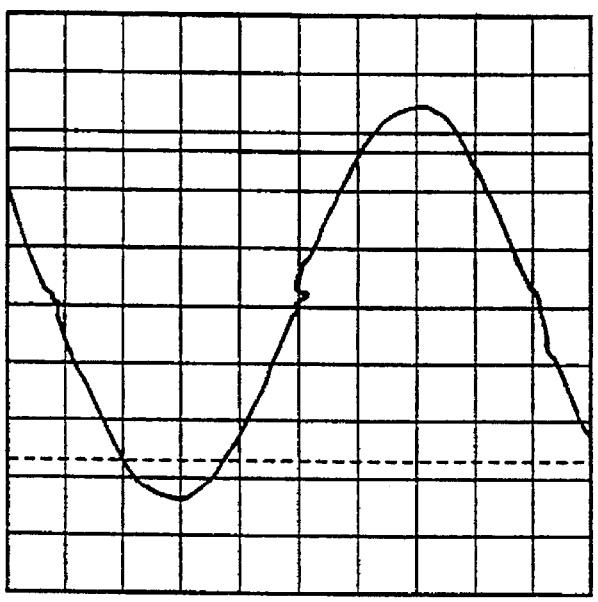

In the above described embodiment, the second lowpass filter 29 is provided to remove the high frequency noise component of the inverter driving waveform pattern $p_{(n)}$ from the following reasons. More specifically, in the delay correcting operation performed at adding portion 28a, the delay time is approximated to a constant time period of which minimum unit is the sampling period. Delay smaller than the minimum unit of the sampling period cannot be corrected actually. Therefore, there is inevitably an error between the actual delay characteristic and the corrected result. Therefore, when such inverter control is continued for a long period of time, the high frequency noise component is gradually but indefinitely amplified, as shown in FIG. 6A. Further, in the process for advancing the phase at adding portion 28a, when there is phase difference larger than 90°, the error waveform pattern does not converge to zero but diverges even when the rate of addition of error signal $e_{(n)}$ (which rate is adjustable by changing error amplification rate $\alpha$) is made sufficiently small. Provision of the second lowpass filter 29 enables removal of the high frequency noise component of inverter driving waveform pattern $p_{(n)}$, and therefore a satisfactory inverter output waveform such as shown in FIG. 6B is obtained.

In the above described embodiment, the inverter driving waveform pattern p is output as it is to PWM operating portion 30. However, if there is a margin in operating capability of DSP or the like constituting the high frequency PWM inverter control portion 22, the inverter driving waveform pattern g after its high frequency component is removed by the second lowpass filter 29 may be output to the PWM operating portion 30.

Though error amplification rate $\alpha$ has been constant in the above described embodiment, it may be changed in the following manner in accordance with the amplitude (power) of error signal e. More specifically, if the error amplification rate $\alpha$ is set close to 1, the waveform quickly converges to the desired waveform. However, if there is noise on the feedback signal, that is, on the inverter driving waveform pattern p, the influence of the noise to the inverter output waveform is more severe. Meanwhile, if the error amplification rate $\alpha$ is set close to zero, the waveform does not quickly converge to the desired waveform. However, it becomes less susceptible to the influence of noise. Even when the gate on time $T_{on}$ and the inverter output are not in linear relation, the inverter driving waveform pattern p is gradually modified, and hence satisfactory inverter output waveform can be obtained.

Therefore, when the error signal e has large amplitude, the error amplification rate $\alpha$ is set large, while if the error signal e has small amplitude, the error amplification rate $\alpha$ is set small. Consequently, the follow up speed of the inverter output waveform to the reference waveform pattern is increased, and error at the point of convergence can be suppressed.

In order to realize such control, an amplitude measuring portion for measuring the amplitude of error signal e, and error amplification rate changing portion for changing the error amplification rate $\alpha$ in proportion to the amplitude of the error signal e measured by the amplitude measuring portion, not shown, are newly required in addition to the structure of the above described inverter control device 17.

Further, in the above described embodiment, the time step $\tau$ for correcting the delay time generated during the process of forming error waveform (error amplified signal f after the high frequency component is removed) was set fixedly. However, an adjusting portion for externally adjusting the time step $\tau$ may be provided and the adjusting portion may adjust how much the phase of the error amplified signal f with the high frequency component removed is to be advanced in phase. By doing so, even when elements having influence on the delay time vary between inverter devices 1 and delay time differ slightly between each of the inverter devices 1, the difference in the delay time can be suppressed by adjusting the degree of phase advancement by the adjusting portion. The elements having influence to the delay time includes variation of circuit constants of various electronic components (capacitors 9, high frequency transformer 6, diode bridge 7, DC reactor 8, AC filter 13 and so on) constituting the inverter device 1.

Further, in the above embodiment, inverter control in which inverter driving waveform pattern of ½ period is updated at every one period of the fundamental frequency has been described. However, in the present invention, the waveform pattern of one period or ¼ period may be taken out for operation at every one period of the fundamental frequency. However, if the waveform pattern of ¼ period is to be taken out, a waveform forming portion for forming a waveform pattern of ½ period or one period based on the taken ¼ period waveform pattern is newly required.

Further, forming the waveform pattern of ¼ period, ½ period, 1 period or n periods may be performed at every n periods (n:natural number). In that case, the mains synchronizing signal R must be set in accordance with n periods.

In the above described embodiment, inverter control is performed by detecting the inverter output current value. However, a device having similar structure may be used for performing inverter control by detecting voltage value of the inverter output. In that case also, similar effects as described in the following can be obtained.

The present invention provides the following effects.

(1) Since feedback control is possible while delay time in the inverter mains circuit or in the detecting portion for detecting the output waveform therefrom is corrected, generation of high frequency oscillation caused by such delay element can be suppressed.

(2) It becomes possible to use a lowpass filter having high attenuation in detecting the waveform of the inverter output, so that noise resistance can further be improved.

(3) Since high frequency filtering of the inverter driving waveform pattern itself, which is the result of integration of the error waveform pattern, is performed, operation is stable even when there is some error in estimating the delay time which should be considered in feeding back the inverter output waveform.

(4) Even when the gate on time and the inverter output are not in linear relation, the inverter driving waveform pattern can be gradually modified if a prescribed coefficient to be multiplied by the error waveform pattern is set small, whereby satisfactory inverter output waveform can be obtained.

(5) By changing the prescribed coefficient to be multiplied by the error waveform pattern in proportion to the amplitude of the error waveform pattern, the output waveform can be made close to the reference waveform quickly.

(6) By adjusting how the error waveform pattern is to be advanced in its phase, even when elements having influence to the delay time vary between inverter devices and the delay time slightly differ between each of the inverter devices, the difference in delay time can be suppressed, and precision in inverter control is improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of controlling an inverter for adjusting a periodic inverter output waveform to a desired periodic waveform, comprising the steps of:

forming an error waveform pattern between an inverter output waveform of a present prescribed period and a desired periodic waveform generated in synchronization with said prescribed period, and adding the error waveform pattern to an inverter driving waveform pattern of a last prescribed period for updating the inverter driving waveform pattern.

2. The method of controlling an inverter according to claim 1, further comprising the step of advancing phase of said error waveform pattern by a prescribed time period relative to the inverter driving waveform pattern of said last prescribed period.

3. The method of controlling an inverter according to claim 2, wherein said step of advancing phase of said error waveform pattern includes the step of advancing phase of said error waveform pattern relatively, by setting earlier, by a prescribed time period a gate on time of a high frequency inverter bridge generated from the inverter driving waveform pattern of said last prescribed period.

4. The method of controlling an inverter according to claim 1, further comprising the step of performing high frequency filtering on the inverter driving waveform pattern of said last prescribed period.

5. The method of controlling an inverter according to claim 1, further comprising the step of multiplying said error waveform pattern by an arbitrary coefficient.

6. The method of controlling an inverter according to claim 5, further comprising the step of changing said arbitrary coefficient in proportion to amplitude of said error waveform pattern.

7. A device for controlling an inverter adjusting a periodic inverter output waveform to a desired periodic waveform, comprising:

memory means for storing an inverter driving waveform pattern of a last prescribed period;

error waveform pattern generating means for generating an error waveform pattern between an inverter output waveform of a present prescribed period and a desired periodic waveform generated in synchronization with said present prescribed period; and updating means for adding said error waveform pattern generated by said error waveform pattern generating means to the inverter driving waveform pattern of the last prescribed period stored in said memory means for updating the inverter driving waveform pattern.

8. The inverter control device according to claim 7, wherein said updating means advances phase of said error waveform pattern by a prescribed time period relative to the inverter driving waveform pattern in said last prescribed period, and adds it to the inverter driving waveform pattern of said last prescribed period.

9. The inverter control device according to claim 8, further comprising adjusting means for adjusting a degree of advancement in phase of said error waveform pattern.

10. The inverter control device according to claim 7, further comprising high frequency filtering means for performing high frequency filtering on the inverter driving waveform pattern in said last prescribed period.

11. The inverter control device according to claim 7, wherein said updating means multiplies said error waveform pattern by an arbitrary coefficient and adds the result to the inverter driving waveform pattern of said last prescribed period.

12. The inverter control device according to claim 11, wherein said updating means changes said arbitrary coefficient in proportion to amplitude of said error waveform pattern.

* * * * *